(12) United States Patent
Rostami

(10) Patent No.: US 8,487,476 B2
(45) Date of Patent: Jul. 16, 2013

(54) APPARATUS AND METHODS FOR POWERING MOBILE DEVICES

(76) Inventor: Ramin Rostami, Calabasas, CA (US)

( * ) Notice: Subject to any disclaimer, the term of this patent is extended or adjusted under 35 U.S.C. 154(b) by 731 days.

(21) Appl. No.: 12/572,276

(22) Filed: Oct. 2, 2009

(65) Prior Publication Data

US 2010/0225171 A1    Sep. 9, 2010

Related U.S. Application Data

(60) Provisional application No. 61/158,735, filed on Mar. 9, 2009, provisional application No. 61/180,836, filed on May 22, 2009.

(51) Int. Cl.
*H02J 1/00* (2006.01)

(52) U.S. Cl.
USPC .............................................. 307/72; 307/80

(58) Field of Classification Search
USPC ...................................................... 307/72, 80
See application file for complete search history.

(56) References Cited

U.S. PATENT DOCUMENTS

| | | | |
|---|---|---|---|
| 7,753,713 B2 * | 7/2010 | Neale, III | 439/358 |
| 2003/0230934 A1 | 12/2003 | Cordelli | |
| 2005/0017685 A1 | 1/2005 | Rees | |

* cited by examiner

*Primary Examiner* — Hal Kaplan
(74) *Attorney, Agent, or Firm* — Merle W Richman, Esq.

(57) ABSTRACT

Embodiments of a system, topology, and methods for providing power to mobile devices are described generally herein. Other embodiments may be described and claimed.

18 Claims, 18 Drawing Sheets

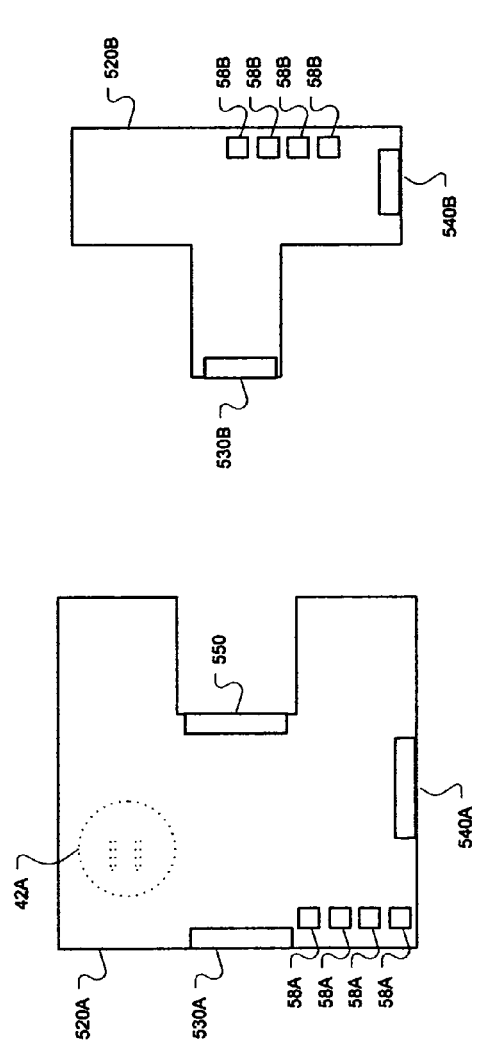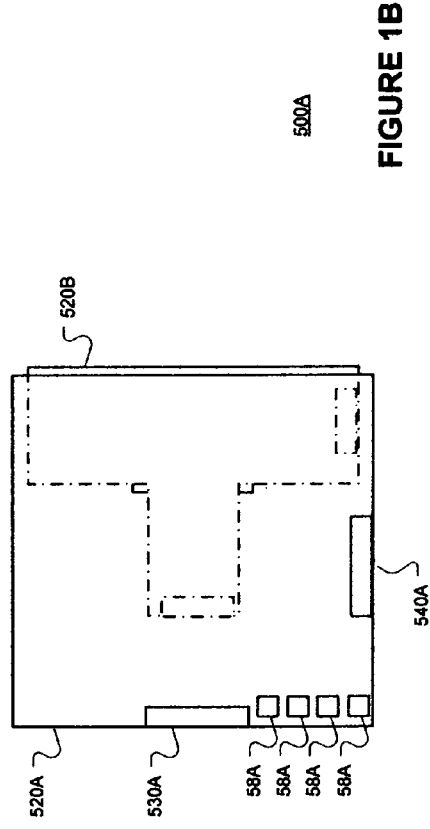

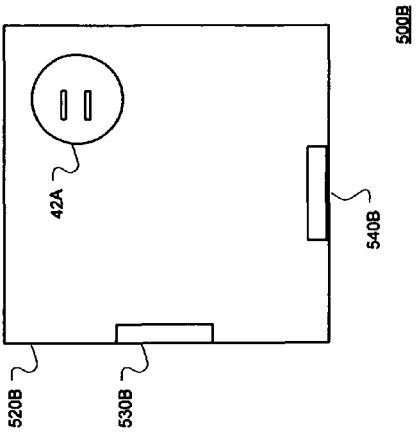
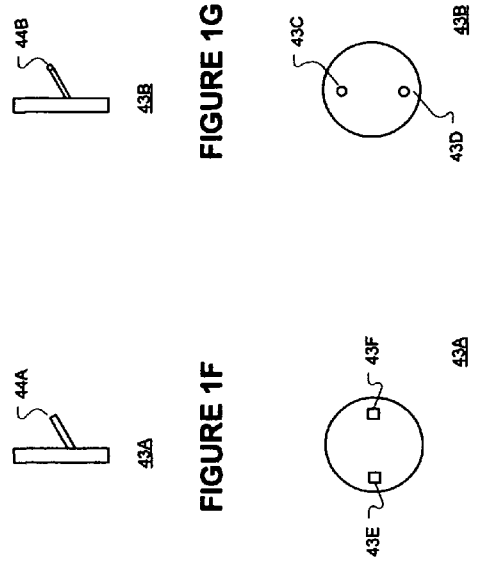
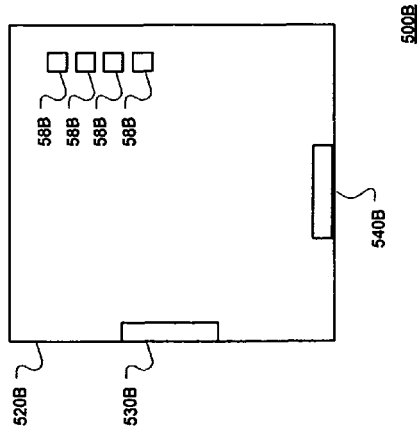
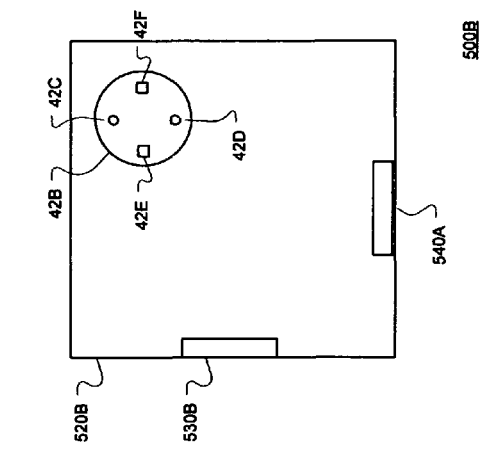

APPARATUS AND METHODS FOR POWERING MOBILE DEVICES

CROSS REFERENCE TO RELATED APPLICATIONS

The present application claims priority to co-pending application Ser. No. 61/158,735, entitled "APPARATUS AND METHOD FOR POWERING A MOBILE DEVICE", and filed on Mar. 9, 2009 and co-pending application Ser. No. 61/180,836, entitled "APPARATUS AND METHOD FOR POWERING A MOBILE DEVICES", and filed on May 22, 2009.

TECHNICAL FIELD

Various embodiments described herein relate to apparatus for providing electrical power mobile devices.

BACKGROUND INFORMATION

It may be desirable to be able to provide power to one or more mobile devices using a single device coupled or uncoupled to an independent or external power source. The present invention such a device.

BRIEF DESCRIPTION OF THE DRAWINGS

FIG. 1A is a simplified diagram of a mobile device power supply architecture with two power elements decoupled according to various embodiments.

FIG. 1B is a simplified diagram of a mobile device power supply architecture with two power elements coupled according to various embodiments.

FIG. 1C is a front view of a simplified diagram of a mobile device power supply architecture according to various embodiments.

FIG. 1D is a back view of a simplified diagram of a mobile device power supply architecture according to various embodiments.

FIG. 1E is another back view of a simplified diagram of a mobile device power supply architecture and external power source cavity according to various embodiments.

FIG. 1F-1I are simplified diagrams of mobile device power supply architecture external power source mechanical interfaces according to various embodiments.

DETAILED DESCRIPTION

Figure 2A:
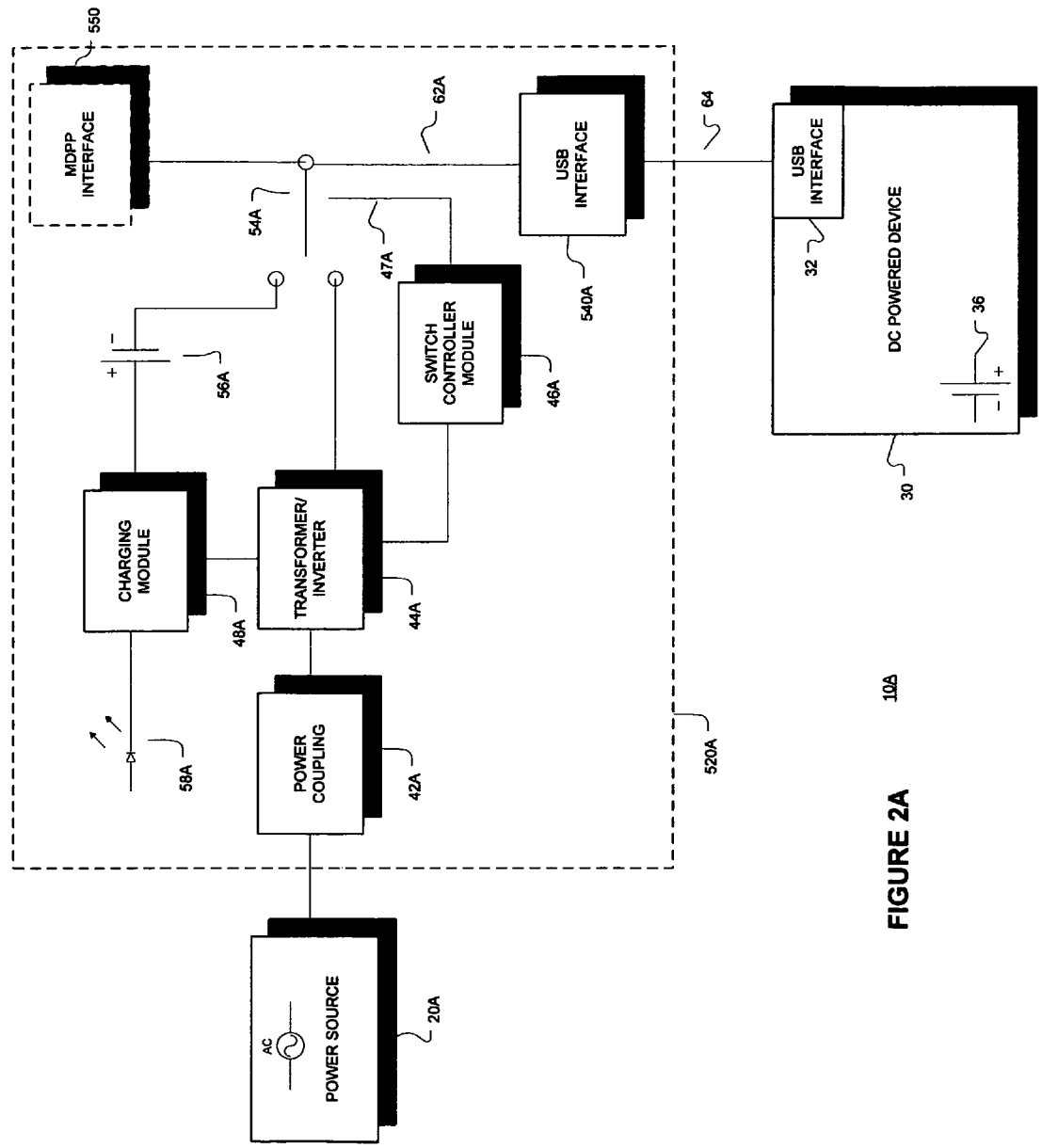
FIG. 2A is a block diagram of an architecture including a first mobile device power supply element according to various embodiments.

FIGS. 1A and 1B are simplified diagrams of a mobile device power supply architecture 500A according to various embodiments. The architecture 500A includes two, separable mobile device power providers (MDPP) 520A, 520B where the second mobile device power provider 520B may be couplable with the first mobile device power provider 520A. In an embodiment the second mobile device power provider 520B may be recessed in at least a portion 550 of the first mobile device power provider 520A as shown in FIG. 1B. In an embodiment the first mobile device power provider 520A may include a first external or independent power input coupling 530A and a second external power input mechanical coupling 42A, a mobile device power interface 540A, a second mobile device power provider power output interface 550, and a plurality of user perceptible signal generation devices 58A.

FIG. 1F-1I are simplified diagrams of mobile device power supply architecture external power source mechanical interfaces 43A, 43B according to various embodiments. Each external power source mechanical interfaces 43A, 43B may be removably couplable to an external power source cavity (42B in FIG. 1E). The cavity 42B may have a plurality of electrical contacts 42C-42F that may couple various electrical contacts 43C-43F of the external power source mechanical interfaces 43A, 43B. In an embodiment the external power source mechanical interfaces 43A, 43B may be configured to couple to external alternating current (AC) power source where power characteristics of the external AC power source may vary geographical as well known to one of skill in the art, e.g., the operating voltage may be about 100, 110, and 220 volts. In order to prevent potential damage to AC powered devices, different external AC power sources may require different mechanical interfaces (44A, 44B).

In an embodiment the external power source mechanical interface 43A may have electrical contacts 43E, 43F that engage contacts 42E, 42F when the interface 43A is inserted into the cavity 42B. Similarly, the external power source mechanical interface 43B may have electrical contacts 43C, 43D that engage contacts 42C, 42D when the interface 43B is inserted into the cavity 42B. Contacts 42E, 42F may be configured to receive external AC power having one of a voltage about 100 or 110 volts and about 220 volts. Similarly, Contacts 42C, 42D may be configured to receive external AC power having one of a voltage about 220 volts and about 100 or 110 volts. In an embodiment a external power source mechanical interface 43A, 43B may be rotatably inserted into the cavity 42B. Further the external power source mechanical interface 43A, 43B prongs 44A, 44B may be foldable within the interface 43A, 43B.

In an embodiment the interface 43A prongs 44A may be straight blades that are designed to couple to an external AC power source having about a 100 or 110 voltage and the contacts 42E, 42F may be configured to be coupled to an AC power source having about a 100 or 110 voltage. The interface 43B prongs 44B may be cylindrical and designed to be coupled to an external AC power source having about a 220 voltage and the contacts 42C, 42D may be configured to be coupled to an AC power source having about a 220 voltage.

The second mobile device power provider or module 520B may include a power input coupling 530B, a mobile device power interface (MDPI) 540B, and a plurality of user perceptible signal generation devices 58B. In an embodiment the first MDPP 520A via interface 550 may provide one of AC or direct current (DC) power to the second MDPP 520B via the power input coupling 530B. In the first and the second mobile device power providers 540A, 540B, the user perceptible signal generation devices 58B may provide an indication of the device's operation including whether the device is coupled to an external power source, an internal power storage unit level (56A, 56B, FIGS. 2A, 2B), charging status of an internal power storage unit, and discharge state of an internal power storage unit.

FIG. 1C is a front view of a simplified diagram of another mobile device power supply architecture 500B according to various embodiments and FIG. 1D is a back view of the simplified diagram of the mobile device power supply architecture 500B according to various embodiments. The architecture 500B may include a first external or independent power input coupling 530B and a second external power input mechanical coupling 42A, a mobile device power interface 540B, and a plurality of user perceptible signal generation devices 58B. FIG. 1E is a back view of a simplified diagram of the mobile device power supply architecture 500B external power source cavity 42B according to various embodiments where the mobile device power supply architecture external power source mechanical interfaces 43A, 43B may be removably couplable to the external power source cavity 42B.

The cavity 42B may have a plurality of electrical contacts 42C-42F that may couple various electrical contacts 43C-43F of the external power source mechanical interfaces 43A, 43B. The user perceptible signal generation devices 58B may provide an indication of the architecture's 500B operation including whether the device is coupled to an external power source, an internal power storage unit level (56B, FIG. 2B), charging status of an internal power storage unit, and discharge state of an internal power storage unit.

FIG. 2A is a block diagram of an architecture 10A according to various embodiments. The architecture 10A includes an external power source 20, a MDPP 520A, and a direct current (DC) powered mobile device 30. The mobile device 30 may be powered by a USB interface 64 (FIGS. 1C, 1D) or a device specific power interface (132 in FIGS. 2A and 2B). The mobile device 64, 64A, 64B may be coupled to a MDPP 520A, 520B, 140A, 140B, 340A, 340B, 640A, 640B via cable(s) 64, 164, 64A, 64B coupling the mobile device 30, 30A, 30B interface 32, 132, 32A, 32B to a MDPP 520A, 520B, 140A, 140B, 640A, 640B interface 152A, 152B, 252A, 252B, 352A, 540A, 540B, 552A, 552B. The MDPP 520A, 520B, 140A, 140B, 640A, 640B may provide DC electrical energy to one or more DC powered devices 30, 130, 230, 30A, 30B via the interface 32, 132, 32A, 32B.

In an embodiment a DC powered device 30, 130, 230, 30A, 30B may include a rechargeable electrical storage element 36. The MDPP 520A, 520B, 140A, 140B, 340A, 340B, 640A, 640B may provide DC electrical energy to one or more DC powered devices 30, 130, 230, 30A, 30B via the interface 32, 132, 32A, 32B that is sufficient to a) power devices 30, 130, 230, 30A, 30B, b) charge an electrical storage element 36 of devices 30, 130, 230, 30A, 30B, and c) simultaneously power devices 30, 130, 230, 30A, 30B and charge an electrical storage element 36 of devices 30, 130, 230, 30A, 30B. The electrical storage element 36 may be a re-chargeable battery, capacitor, or other device capable of temporarily storing electrical energy.

In an embodiment the MDPP 520A of FIG. 1C may include an Alternating Current (AC) electrical coupling 42A, transformer/inverter 44A, switch controller module 46A, charging module 48A, universal serial bus (USB) interface 540A, multiple position switch 54A, electrical storage element 56A, second MDPP interface 550 and one or more user detectable signal generation modules 58A. The MDPP 520A may be part of the architecture 500A and 500B where the second MDPP interface 550 may be optionally excluded in the architecture 500B. The external power source 20A may supply AC or DC power.

In an embodiment the external power source 20A may be an AC power source. The external power source 20A may be part of an electrical distribution network, independent electrical source, or localized electrical source including a battery 36, generator, or solar generation module. The AC coupling 42A may include multiple electrical contacts that enable a MDPP 520A to receive AC from an external power source 20A. In an embodiment the external power source 20A may supply AC power to the AC coupling 42A via a standard outlet where the AC coupling includes two for a non-grounded application and three prongs for a grounded application.

The transformer/inverter 44A may receive AC power and convert the received power to DC power having a predetermined voltage and amperage as needed or required by one or more DC powered devices 30, 130, 230, 30A, and 30B. The transformer/inverter 44A may also provide electrical energy to a charging module 48A where electrical energy may be the same as the DC power provided to or to be provided to DC powered devices 30, 130, 230, 30A, and 30B or another electrical signal including an AC or DC signal having various waveforms. The transformer/inverter 44A may also provide electrical energy or an indication of energy generation to a switch controller module 46A where the electrical energy may be the same as the DC power provided to be provided to a DC powered devices 30, 130, 230, 30A, and 30B or another electrical signal including an AC or DC signal having various waveforms that provide an indication of whether sufficient energy is being provided by the transformer/inverter 44A to power the DC powered devices 30, 130, 230, 30A, and 30B.

The charging module 48A may receive electrical energy from the transformer/inverter 44A and charge one or more electrical storage elements 56A. The charging module 48A may provide an electrical signal to the one or more user detectable signal generation modules 58A to inform a user when the electrical storage element 56A is being charged, discharged, external power is present, and when one or more DC powered devices 30, 130, 230, 30A, and 30B are electrically coupled to a MDPP 540A, 140A, 240A, 340A, 640A. In an embodiment a charging module 48A, 48B may determine the storage element 56A, 56B level and fast charge the storage element 56A, 56B when the determined level is below a first predetermined level, slow or trickle charge the storage element 56A, 56B when the determined level is below a second level and above the first level, the second level greater than the first level, and not charge the storage element 56A, 56B when the determined level is above a second level. In an embodiment the second level may be about 95% of the maximum level and the second level may be about 80% of the maximum level.

The electrical storage element 56A, 56B may include one or more batteries, capacitors, or other electrical energy storage devices including a lithium ion, NiCad, or other rechargeable medium based element. The switch controller module 46A may work in conjunction with the multiple position switch 54A to direct one of energy from the transformer/inverter 44A and the electrical storage element 56A to the USB interface 540A via the coupling 62A and the second MDPP interface 550. The switch controller module 46A may control the switch 54A as a function of the signal received from the transformer/inverter 44A via the switch control line 47A.

As noted, the MDPP 520A, 520B, 140A, 140B, 340A, 340B, 640A, 640B may provide DC electrical energy to one or more DC powered devices 30, 130, 230, 30A, 30B via the interface 32, 132, 32A, 32B. In an embodiment the USB interface 540A may receive the electrical signal 62A from the switch 54A and provide the electrical signal on the appropriate USB contacts of the USB interface to provide DC electrical power via an electrical coupling 64 to the DC powered device 30 USB interface 32.

Figure 2B:
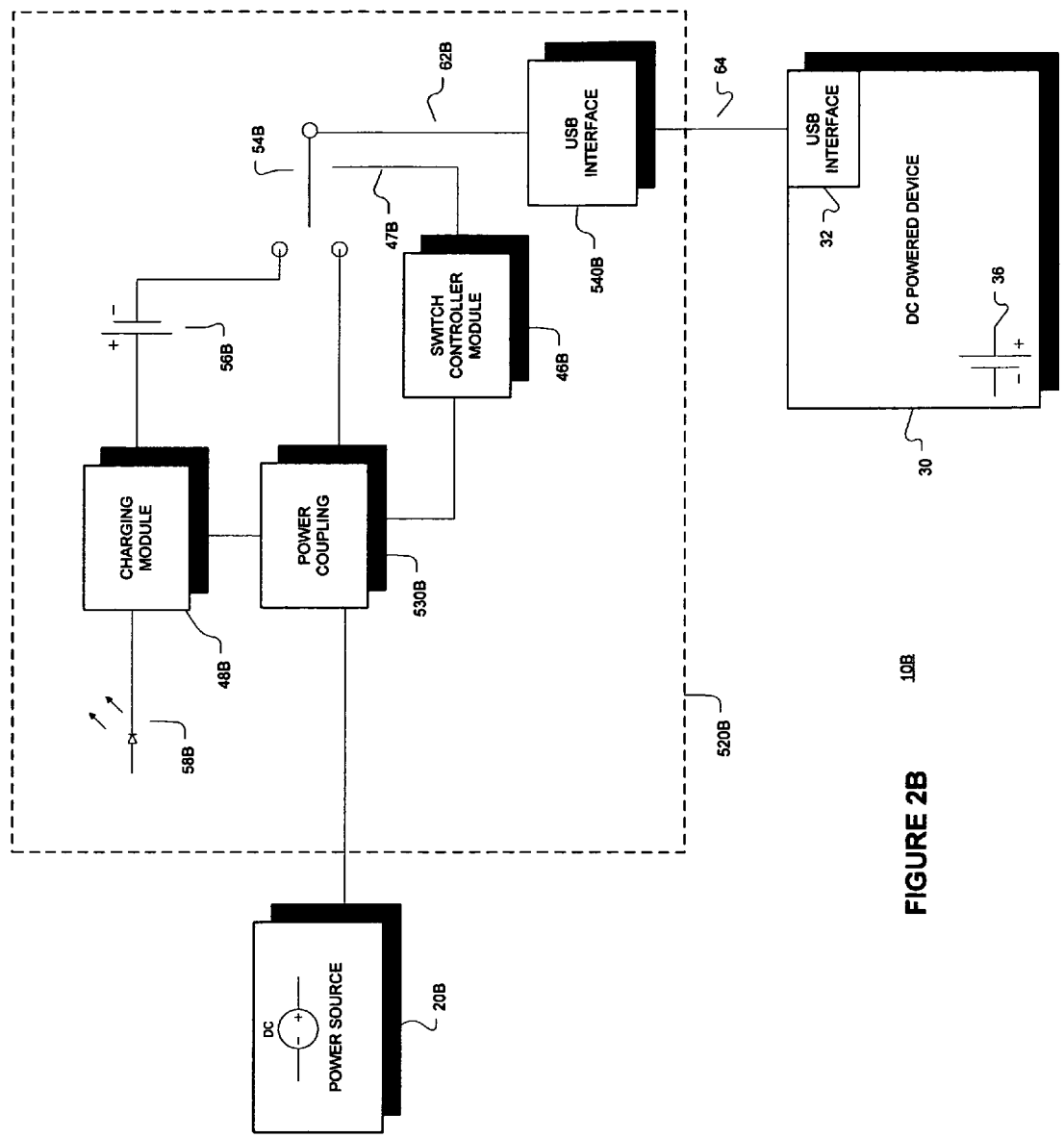
FIG. 2B is a block diagram of an architecture including a second mobile device power supply element according to various embodiments.

FIG. 2B is a block diagram of an architecture 10B including a second MDPP 520B according to various embodiments. The architecture 10B includes an external power source 20B, a second MDPP 520B, and a direct current (DC) powered mobile device 30. The mobile device 30 may be powered by a USB interface 64 or a device specific power interface (132 in FIGS. 2A and 2B). In an embodiment the MDPP 520B of FIG. 1D may include an electrical power coupling 530B, switch controller module 46B, charging module 48B, universal serial bus (USB) interface 540B, multiple position switch 54B, electrical storage element 56B, and one or more user detectable signal generation modules 58B. The external power source 20B may supply AC or DC power. In an embodiment the external power source 20B may be a DC power source. In another embodiment the first MDPP 520A via the mobile device interface (MDI) 550 may provide electrical power (DC power in one embodiment) to the second MDPP 520B via the power coupling 530B. The external power source 20B may be part of an electrical distribution network, independent electrical source, or localized electrical source including a battery 36, generator, or solar generation module. The power coupling 530B may include multiple electrical contacts that enable a MDPP 520A to receive power from an external power source 20B including a MDI 550 of a MDPP 520A.

In an embodiment the external power source 20B may supply DC power to the power coupling 42B via a standard accessory or cigarette outlet where the DC coupling 530B is shaped to interface with such a standard outlet. In an embodiment the MDPP 520A MDI 550 may be configured as standard accessory or cigarette outlet to receive the corresponding DC coupling 530B of a MDPP 520B. The DC coupling 530B may provide electrical energy to a charging module 48B where electrical energy may be the same as the DC power provided to or to be provided to DC powered devices 30, 130, 230, 30A, and 30B or another electrical signal including an AC or DC signal having various waveforms. The power coupling 530B may also provide electrical energy or an indication of energy generation to a switch controller module 46B where the electrical energy may be the same as the DC power provided to be provided to a DC powered devices 30, 130, 230, 30A, and 30B or another electrical signal including an AC or DC signal having various waveforms that provide an indication of whether sufficient energy is being provided by the transformer/inverter 44A to power the DC powered devices 30, 130, 230, 30A, and 30B.

The charging module 48B may receive electrical energy from the power coupling 530B and charge one or more electrical storage elements 56B. The charging module 48B may provide an electrical signal to the one or more user detectable signal generation modules 58B to inform a user when the electrical storage element 56B is being charged, discharged, external power is present, and when one or more DC powered devices 30, 130, 230, 30A, and 30B are electrically coupled to a MDPP 540A, 140A, 240A, 340A, 640A. The electrical storage element 56B may include one or more batteries, capacitors, or other electrical energy storage devices. The switch controller module 46B may work in conjunction with the multiple position switch 54B to direct one of energy from the power coupling 530B and the electrical storage element 56B to the USB interface 540B via the coupling 62B. The switch controller module 46B may control the switch 54B as a function of the signal received from the power coupling 530B via the switch control line 47B.

As noted, the MDPP 520A, 520B, 140A, 140B, 340A, 340B, 640A, 640B may provide DC electrical energy to one or more DC powered devices 30, 130, 230, 30A, 30B via the interface 32, 132, 32A, 32B. In an embodiment the USB interface 540B may receive the electrical signal 62B from the switch 54B and provide the electrical signal on the appropriate USB contacts of the USB interface to provide DC electrical power via an electrical coupling 64 to the DC powered device 30 USB interface 32.

Figure 2C:
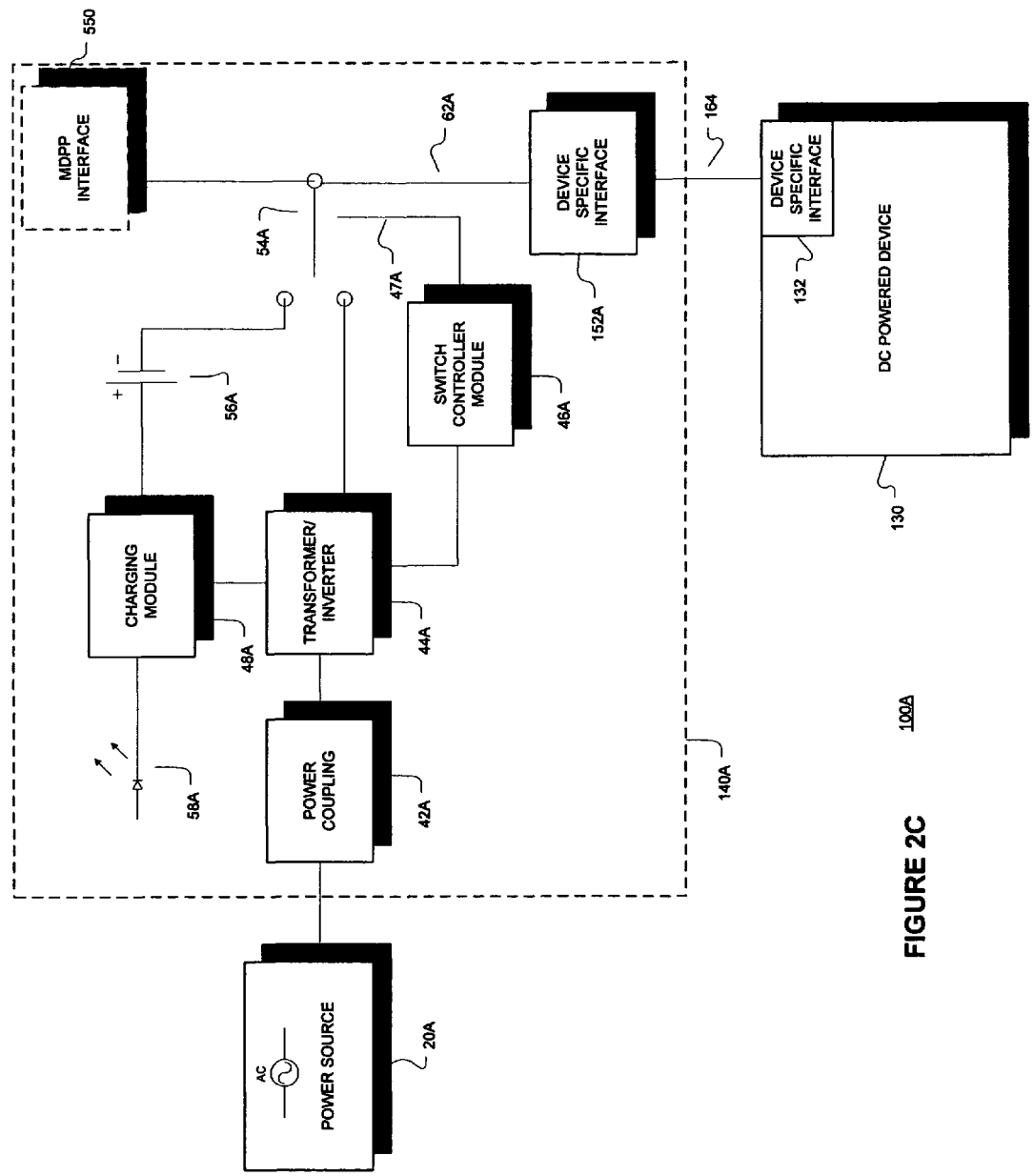
FIG. 2C is a block diagram of an architecture including a first mobile device power supply element according to various embodiments.

FIG. 2C is a block diagram of another first MDPP 500A or provider 500B architecture 100A according to various embodiments. The DC powered device 130 in the architecture 100A may have a device specific power supply interface 132. The MDPP 140A may include an Alternating Current (AC) or DC electrical power coupling 42A, transformer/inverter 44A, a switch controller module 46A, a charging module 48A, a device specific interface 152A, a multiple position switch 54A, an electrical storage element 56A, a MDPP interface 550 (for 500A), and one or more user detectable signal generation modules 58A. The MDPP 140A is similar to MDPP 520A other than the device specific interface 152. In an embodiment the device specific interface 152A may receive the electrical signal 62A from the switch 54A and provide the electrical signal on the appropriate contacts of the device specific interface 152A to provide DC electrical power via an electrical coupling 164 to the DC powered device 130 device specific interface 132.

Figure 2D:
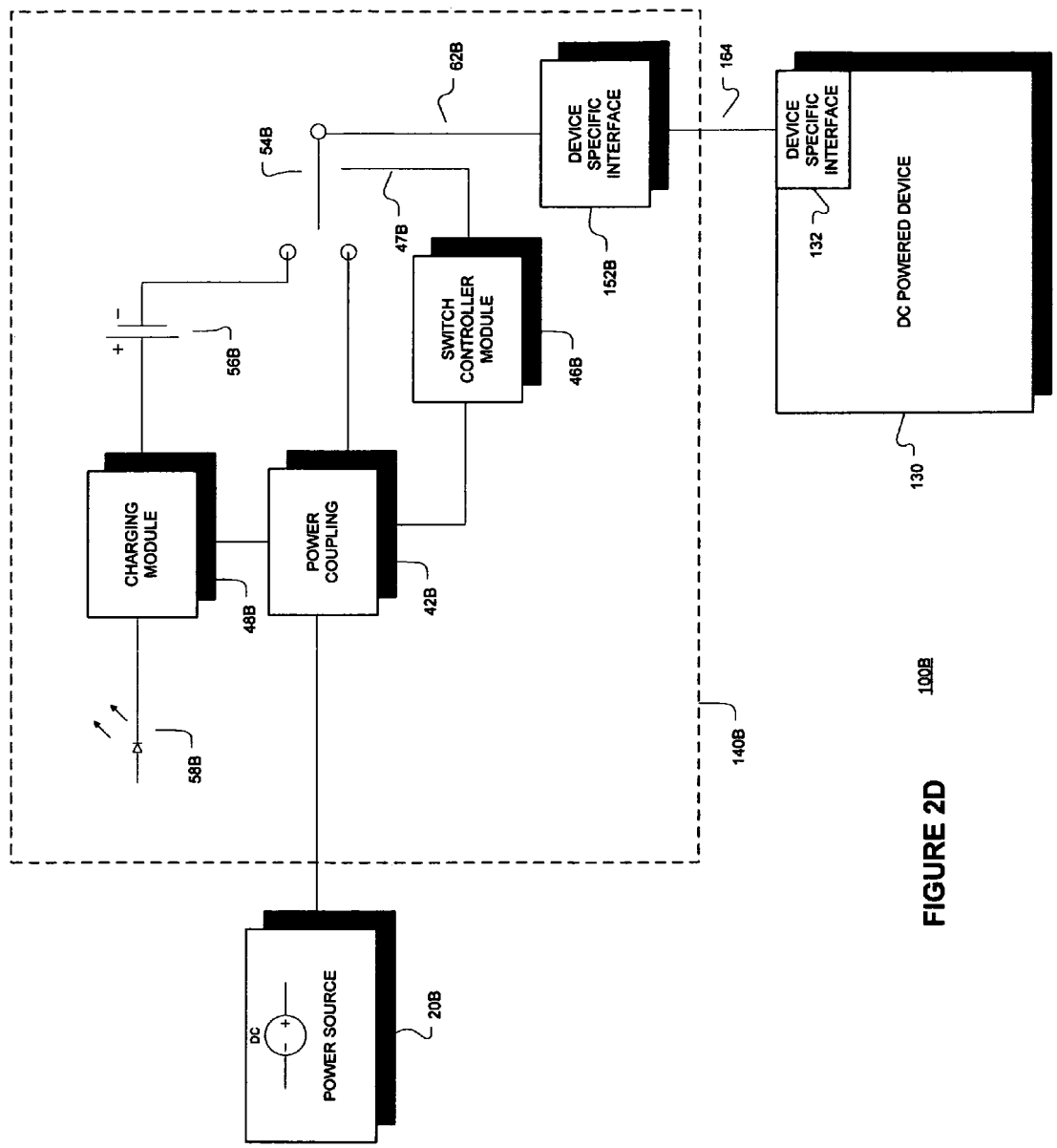
FIG. 2D is a block diagram of an architecture including a second mobile device power supply element according to various embodiments.

FIG. 2D is a block diagram of another second MDPP architecture 100B according to various embodiments. The DC powered device 130 in the architecture 100A may have a device specific power supply interface 132. The MDPP 140B may include an electrical power coupling 42B, a switch controller module 46B, a charging module 48B, a device specific interface 152B, a multiple position switch 54B, an electrical storage element 56B, and one or more user detectable signal generation modules 58B. The MDPP 140B is similar to MDPP 520B other than the device specific interface 152. In an embodiment the device specific interface 152B may receive the electrical signal 62B from the switch 54B and provide the electrical signal on the appropriate contacts of the device specific interface 152B to provide DC electrical power via an electrical coupling 164 to the DC powered device 130 device specific interface 132.

Figure 3A:
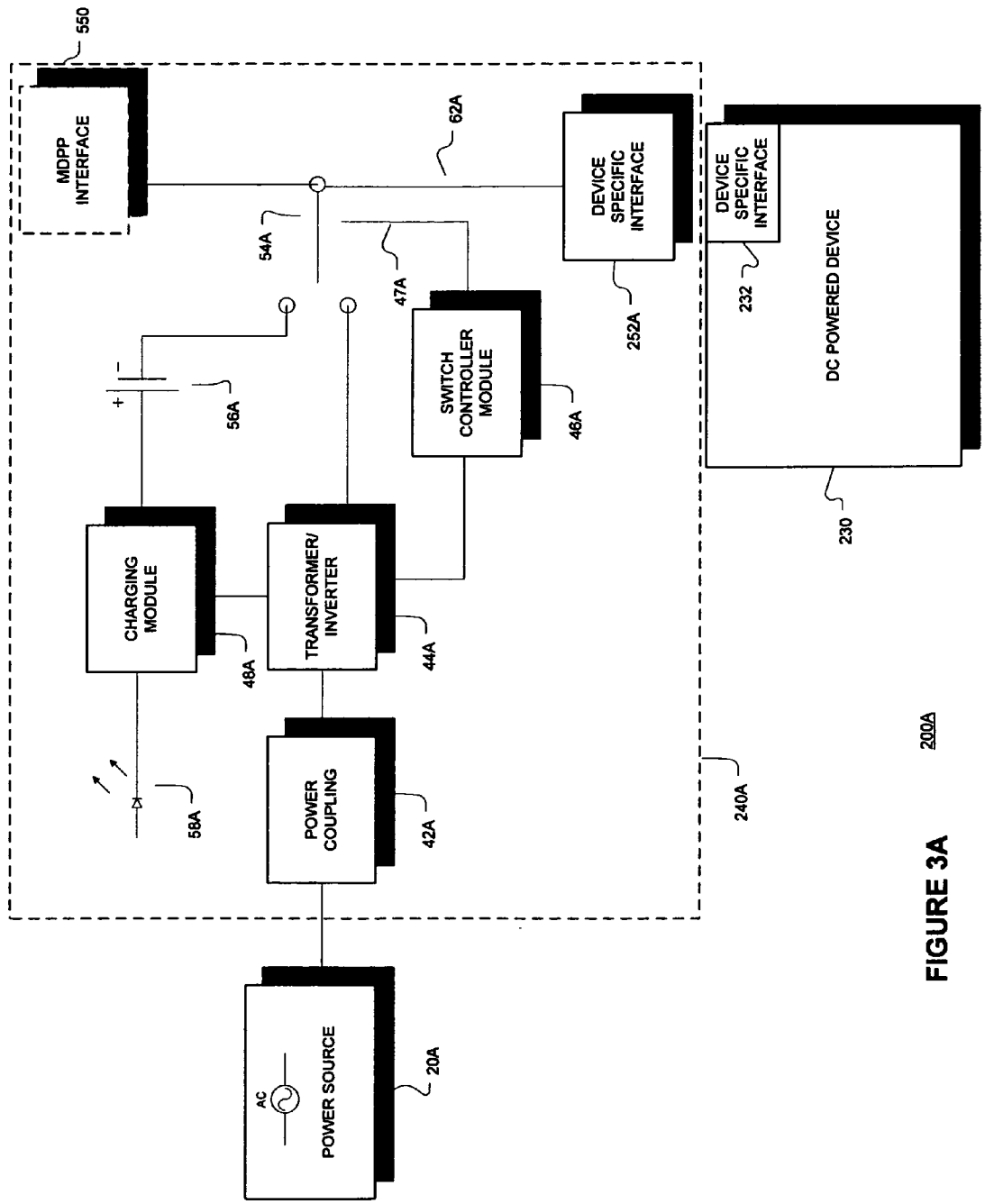
FIG. 3A is a block diagram of an architecture including a first mobile device power supply element according to various embodiments.

FIG. 3A is a block diagram of another first MDPP 500A or provider 500B architecture 200A according to various embodiments. The DC powered device 230 in the architecture 200A may have a device specific power supply interface 232. The MDPP 240A may include an Alternating Current (AC) or DC electrical power coupling 42A, transformer/inverter 44A, a switch controller module 46A, a charging module 48A, a device specific interface 252A, a multiple position switch 54A, an electrical storage element 56A, a MDPP interface 550 (for 500A) and one or more user detectable signal generation modules 58A. The MDPP 240 is similar to MDPP 40, 140 other than the device specific interface 252A. In an embodiment the device specific interface 252 may receive the electrical signal 62 from the switch 54 and provide the electrical signal on the appropriate contacts of the device specific interface 252 directly to the device specific interface 232 of the DC powered device 230. In an embodiment the MDPP 240A device specific interface 252A may be one of a male or female based electrical contact interface and the DC powered device 230 device specific interface 232 may be one of a female or male based electrical contact interface, respectively.

Figure 3B:
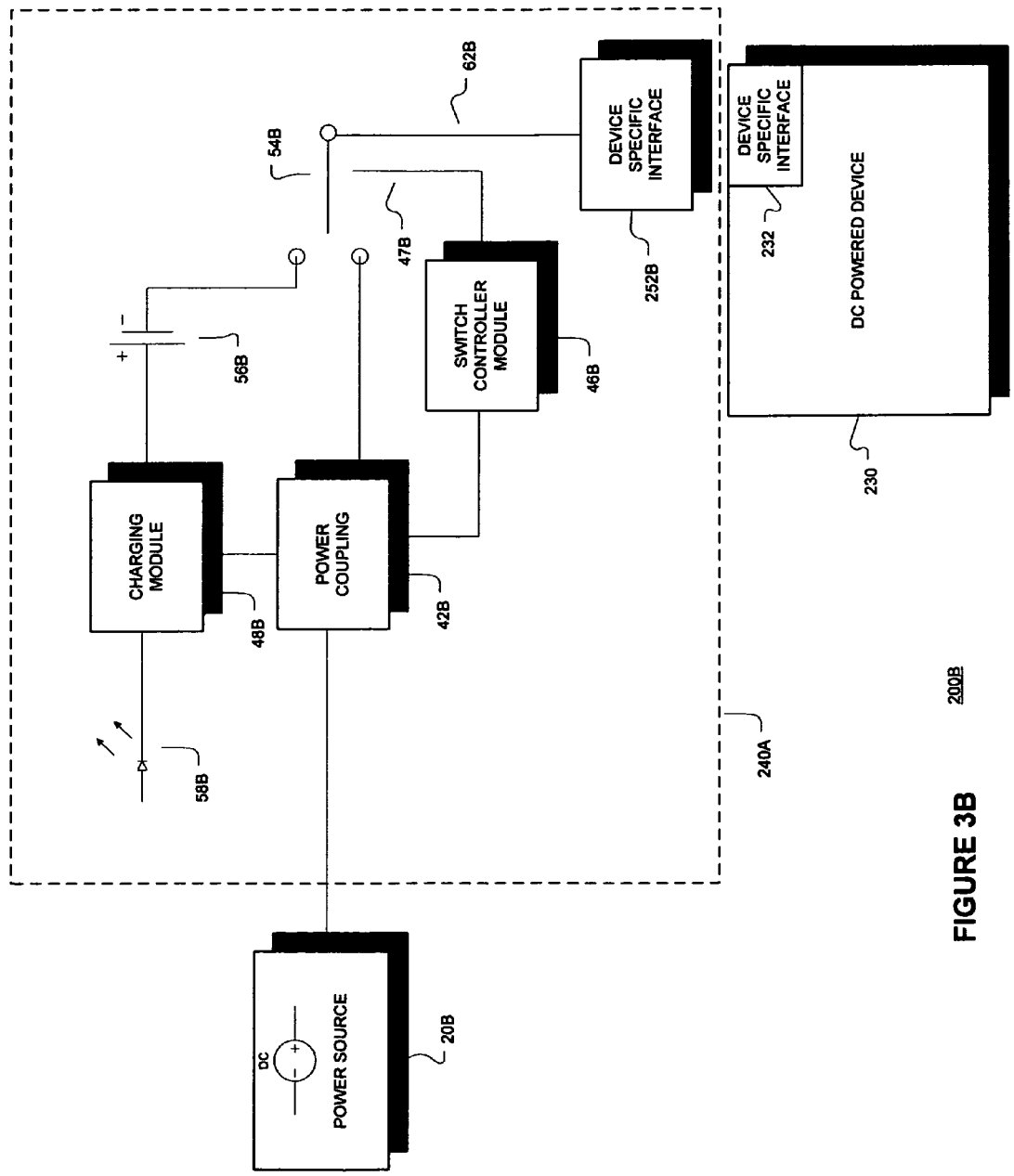
FIG. 3B is a block diagram of an architecture including a second mobile device power supply element according to various embodiments.

FIG. 3B is a block diagram of another second MDPP architecture 200B according to various embodiments. The DC powered device 230 in the architecture 200B may have a device specific power supply interface 232. The MDPP 240B may include an electrical power coupling 42B, a switch controller module 46B, a charging module 48B, a device specific interface 252B, a multiple position switch 54B, an electrical storage element 56B, and one or more user detectable signal generation modules 58B. The MDPP 240 is similar to MDPP 40, 140 other than the device specific interface 252. In an embodiment the device specific interface 252 may receive the electrical signal 62 from the switch 54 and provide the electrical signal on the appropriate contacts of the device specific interface 252B directly to the device specific interface 232 of the DC powered device 230. In an embodiment the MDPP 240B device specific interface 252A may be one of a male or female based electrical contact interface and the DC powered device 230 device specific interface 232 may be one of a female or male based electrical contact interface, respectively.

Figure 4A:
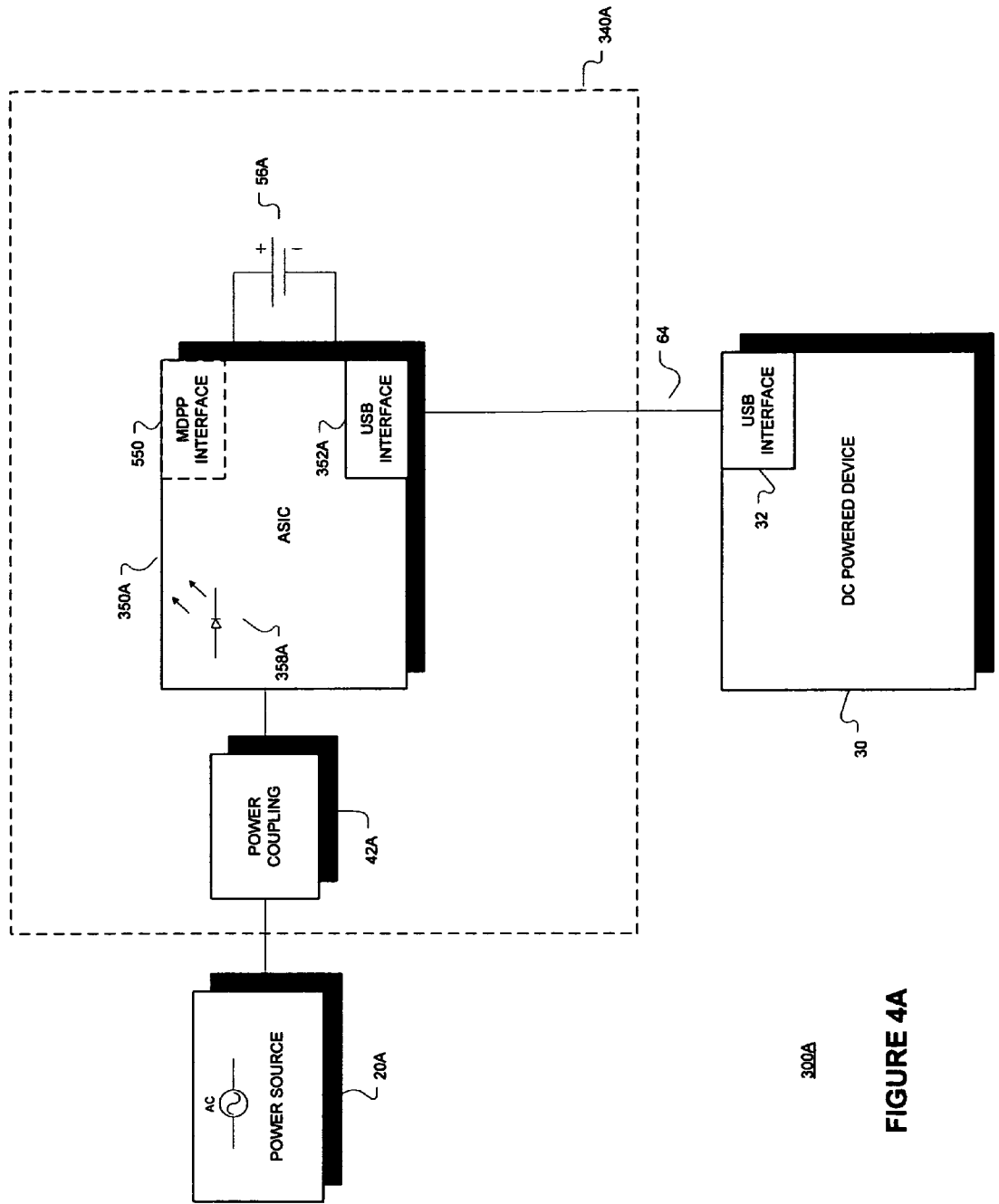
FIG. 4A is a block diagram of an architecture including a first mobile device power supply element according to various embodiments.

FIG. 4A is a block diagram of another first MDPP 500A or provider 500B architecture 300A according to various embodiments. The DC powered device 30 in the architecture 300A may have a USB interface 32 or device specific interface 232, 132. The MDPP 340A may include an Alternating Current (AC) or DC electrical power coupling 42A, an Application Specific Integrated Circuit (ASIC) 350A, and an electrical storage element 56A. The ASIC 350A may include one or more user detectable signal generation modules 358A as part of or coupled to the ASIC 350A. The ASIC 350A may perform the functions of the transformer/inverter 44A, switch controller module 46A, charging module 48A, a USB interface 52A, and a multiple position switch 54A. In an embodiment the MDPP USB interface 352A may be one of a male or female based electrical contact interface and the DC powered device 30 USB interface 32 may be one of a female or male USB interface, respectively.

In embodiment the MDPP 340A ASIC 350A may receive an electrical signal from the AC/DC power coupling 42A and the electrical storage element 56A. The ASIC 350A may determine whether the electrical signal provided by the AC/DC power coupling 42A is sufficient to provide power one or more DC powered device(s) 30 and may direct energy from the electrical storage element 56A alone in combination with the AC/DC coupling electrical signal (if present and insufficient) to provide an electrical signal on an USB interface 352A built into the ASIC 350A. An electrical cable 64 may couple the ASIC 350A USB interface 352A to the DC powered device 30 USB interface 32. The ASIC 350A may also control the charging of the electrical storage element 56A when sufficient electrical energy is provided by the AC/DC coupling 42A. The ASIC 350A may include an MDPP interface 550 (in 500A) where the second MDPP 550 power coupling 42B may be coupled to the MDPP interface 550.

The ASIC 350A may further transform or invert the electrical energy provided by the AC/DC coupling 42A to the DC voltage/amperage rating needed to charge the electrical storage element 56A and provide power to the DC powered device 30. The ASIC 350A via one or more user detectable signal generation modules 358A may inform a user when the electrical storage element 56A is being charged, discharged, external power is present, and when one or more DC powered devices 30 are electrically coupled to the MDPP 340A. In an embodiment a user detectable signal generation module 58, 358, 558 may include one or more light emitting diodes (LEDs), other light generation devices, vibration modules, or audible generation devices (speakers).

Figure 4B:
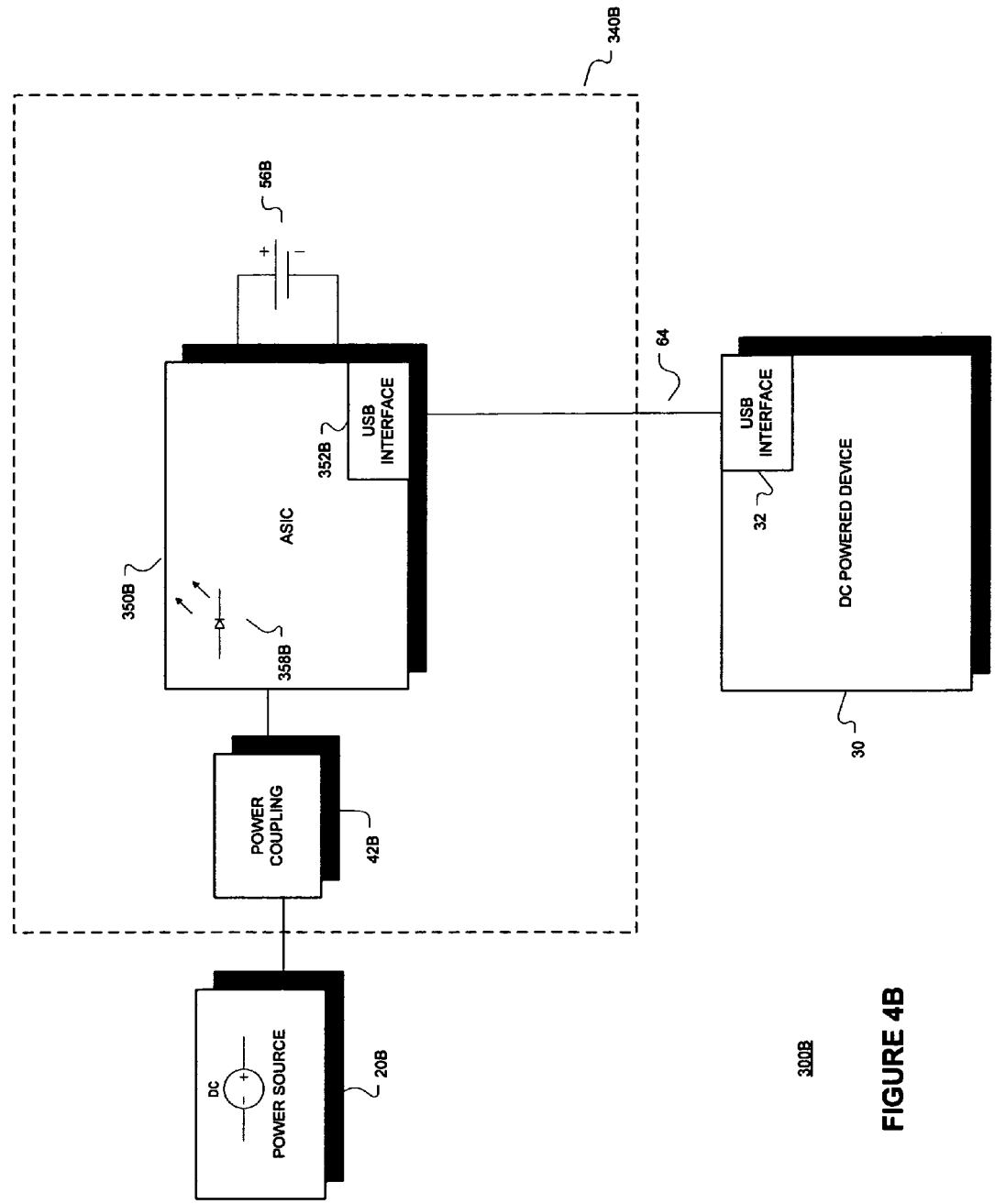
FIG. 4B is a block diagram of an architecture including a second mobile device power supply element according to various embodiments.

FIG. 4B is a block diagram of another second MDPP architecture 340B according to various embodiments. The DC powered device 30 in the architecture 340B may have a USB interface 32 or device specific interface 232, 132. The MDPP 340B may include an Alternating Current (AC) or DC electrical power coupling 42B, an Application Specific Integrated Circuit (ASIC) 350B, and an electrical storage element 56B. The ASIC 350B may include one or more user detectable signal generation modules 358B as part of or coupled to the ASIC 350B. The ASIC 350B may perform the functions of the switch controller module 46B, charging module 48B, a USB interface 52B, and a multiple position switch 54B. In an embodiment the MDPP USB interface 352B may be one of a male or female based electrical contact interface and the DC powered device 30 USB interface 32 may be one of a female or male USB interface, respectively.

In embodiment the MDPP 340B ASIC 350B may receive an electrical signal from the AC/DC power coupling 42B and the electrical storage element 56B. The ASIC 350B may determine whether the electrical signal provided by the AC/DC power coupling 42B is sufficient to provide power one or more DC powered device(s) 30 and may direct energy from the electrical storage element 56B alone in combination with the AC/DC coupling electrical signal (if present and insufficient) to provide an electrical signal on an USB interface 352B built into the ASIC 350B. An electrical cable 64 may couple the ASIC 350B USB interface 352B to the DC powered device 30 USB interface 32. The ASIC 350B may also control the charging of the electrical storage element 56B when sufficient electrical energy is provided by the AC/DC coupling 42B.

The ASIC 350B may further transform or invert the electrical energy provided by the AC/DC coupling 42B to the DC voltage/amperage rating needed to charge the electrical storage element 56B and provide power to the DC powered device 30. The ASIC 350B via one or more user detectable signal generation modules 358B may inform a user when the electrical storage element 56B is being charged, discharged, external power is present, and when one or more DC powered devices 30 are electrically coupled to the MDPP 340B.

Figure 5A:
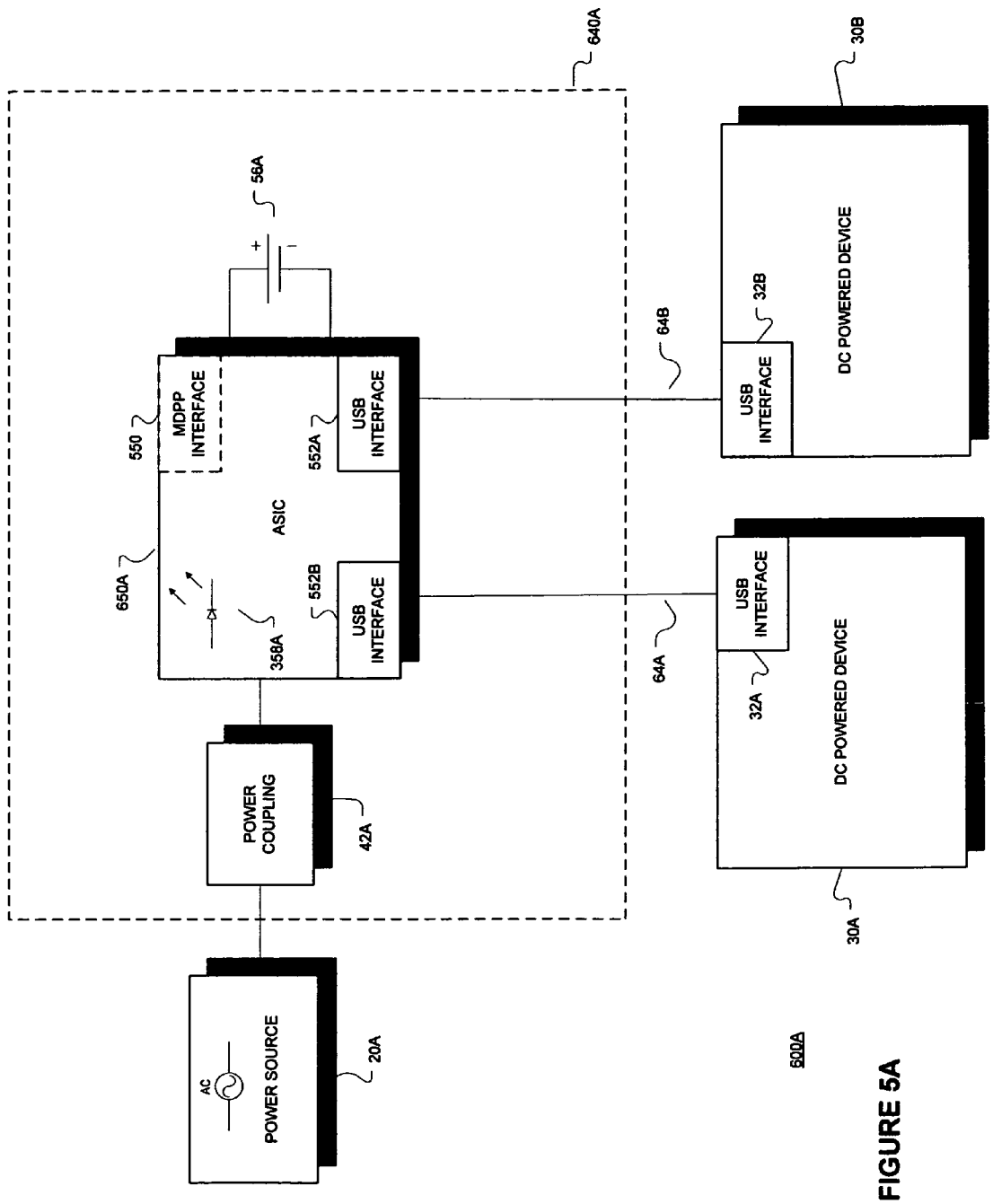
FIG. 5A is a block diagram of an architecture including a first mobile device power supply element according to various embodiments.

FIG. 5A is a block diagram of another first MDPP 500A or provider 500B architecture 600A according to various embodiments. Multiple DC powered devices 30A, 30B in the architecture 500 may have a USB interface 32A, 32B or device specific interface 232, 132. The MDPP 640A may include an Alternating Current (AC) or DC electrical power coupling 42A, an Application Specific Integrated Circuit (ASIC) 650A, and an electrical storage element 56A. The ASIC 650A may include one or more user detectable signal generation modules 358A as part of or coupled to the ASIC 650A. In embodiment the MDPP 640A ASIC 650A may receive an electrical signal from the AC/DC power coupling 42A and the electrical storage element 56A.

The ASIC 650A may determine whether the electrical signal provided by the AC/DC power coupling 42A is sufficient to provide power to the two or more DC powered device(s) 30A, 30B and may direct energy from the electrical storage element 56A alone in combination with the AC/DC power coupling 42A electrical signal (if present and insufficient) to provide an electrical signal on multiple USB interfaces 552A, 552B built into the ASIC 650A. Electrical cables 64A, 64B may couple the ASIC 650A USB interfaces 552A, 552B to the DC powered device 30A, 30B USB interfaces 32A, 32B. The ASIC 650A may also control the charging of the electrical storage element 56A when sufficient electrical energy is provided by the AC/DC power coupling 42A.

Figure 5B:
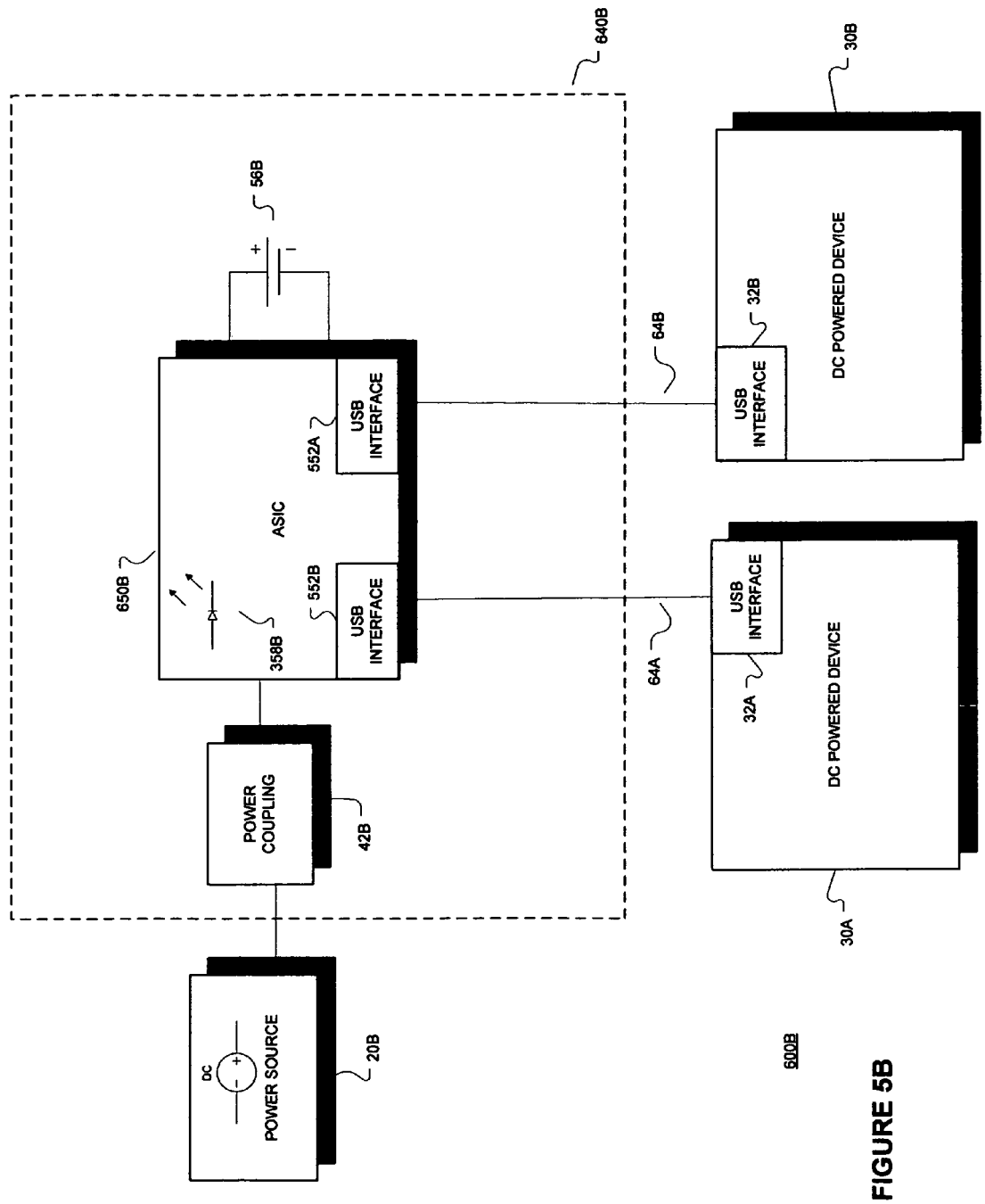
FIG. 5B is a block diagram of an architecture including a second mobile device power supply element according to various embodiments.

FIG. 5B is a block diagram of another second MDPP architecture 600B according to various embodiments. Multiple DC powered devices 30A, 30B in the architecture 600B may have a USB interface 32A, 32B or device specific interface 232, 132. The MDPP 640B may include an Alternating Current (AC) or DC electrical power coupling 42B, an Application Specific Integrated Circuit (ASIC) 650B, and an electrical storage element 56B. The ASIC 650B may include one or more user detectable signal generation modules 358B as part of or coupled to the ASIC 650B. In embodiment the MDPP 640B ASIC 650B may receive an electrical signal from the AC/DC electric power coupling 42B and the electrical storage element 56B.

The ASIC 650B may determine whether the electrical signal provided by the AC/DC power coupling 42B is sufficient to provide power to the two or more DC powered device(s) 30A, 30B and may direct energy from the electrical storage element 56B alone in combination with the AC/DC power coupling 42B electrical signal (if present and insufficient) to provide an electrical signal on multiple USB interfaces 552A, 552B built into the ASIC 650B. Electrical cables 64A, 64B may couple the ASIC 650B USB interfaces 552A, 552B to the DC powered device 30A, 30B USB interfaces 32A, 32B. The ASIC 650B may also control the charging of the electrical storage element 56B when sufficient electrical energy is provided by the AC/DC power coupling 42B.

Figure 6A:
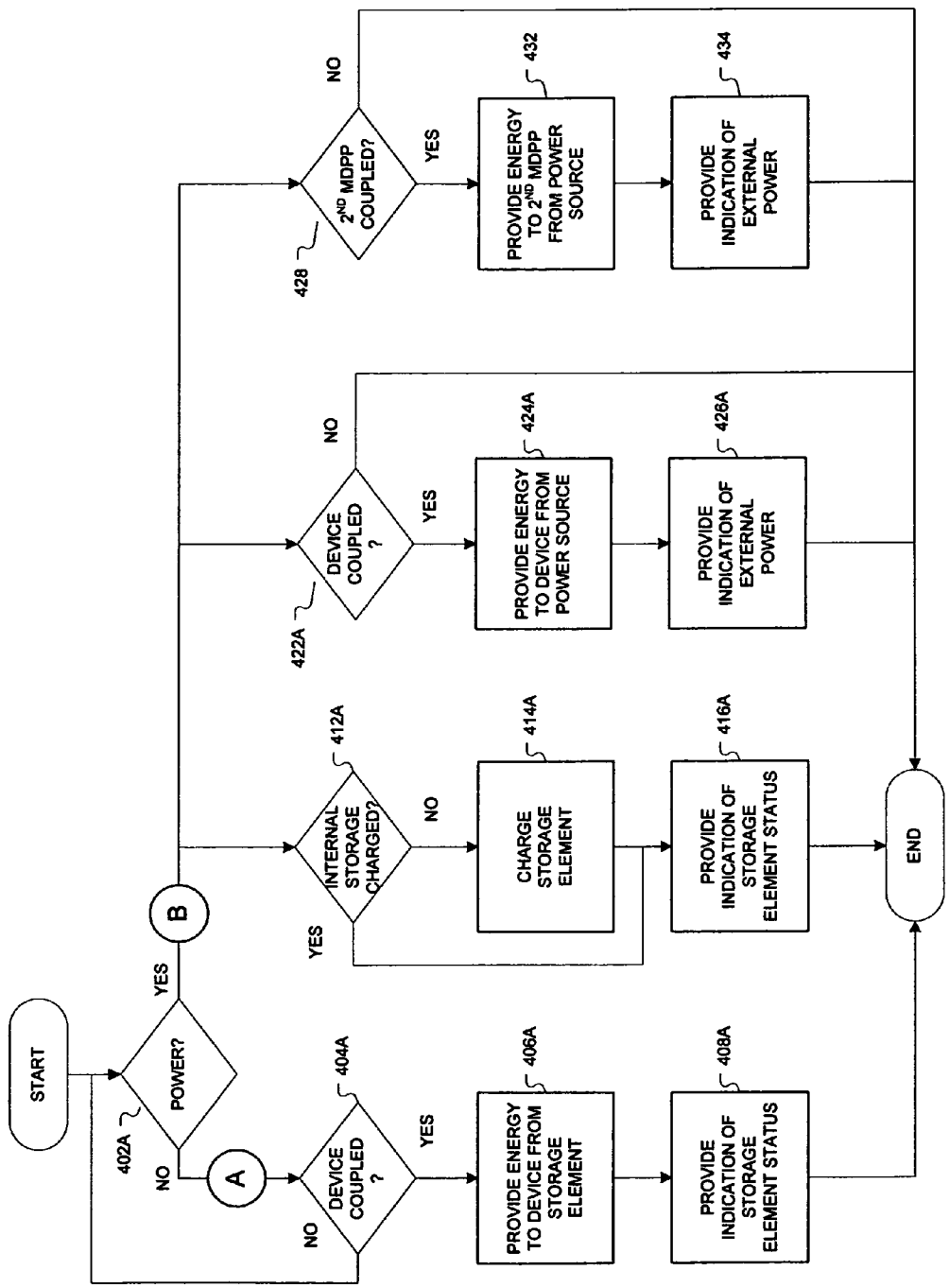
FIGS. 6-6E are flow diagrams illustrating several methods according to various embodiments.

FIG. 6A is a flow diagram illustrating several methods 400A according to various embodiments. An ASIC 350A, 650A may employ the method 400A illustrated by the FIG. 6A flow diagram. The method 400A may determine whether sufficient power is being provided by an external power source 20A to power one or more devices 30, 130, 230, 30A, 30B (activity 402A). When the power is insufficient and at least one device is coupled to a MDPP 340A, 640A (activity 404A), the method 400A may provide energy to the one or more devices 30, 30A, 30B from an electrical storage element 56A (activity 406A) and provide an indication of the electrical storage element 56A via the user detectable signal generation device 358A (activity 406A, 408A).

When sufficient power is provided by the external power source 20A and the electrical storage device 56A is not fully charged (activity 412A) the method 400A may charge the electrical storage element 56A (activity 414A) and provide an indication of the electrical storage element 56A charge level via the user detectable signal generation device 358A (activity 416A). Further when sufficient power is provided by the external power source 20A (activity 402A) and at least one device 30, 30A, 30B is coupled to the MDPP 340, 540 (activity 422A) the method 400A may provide energy to the one or more devices 30, 30A, 30B from the external power source 20A (activity 424A) and provide an indication of the existence of power from the external power source 20A via the user detectable signal generation device 358A (activity 426A).

Further when sufficient power is provided by the external power source 20A (activity 402A) and a second MDPP 140B, 240B, 640B (activity 428) the method 400A may provide energy to the 2nd MDPP 140B, 240B, 640B from the external power source 20A (activity 432) and provide an indication of the existence of power from the external power source 20A via the user detectable signal generation device 358A (activity 434).

Figure 6B:
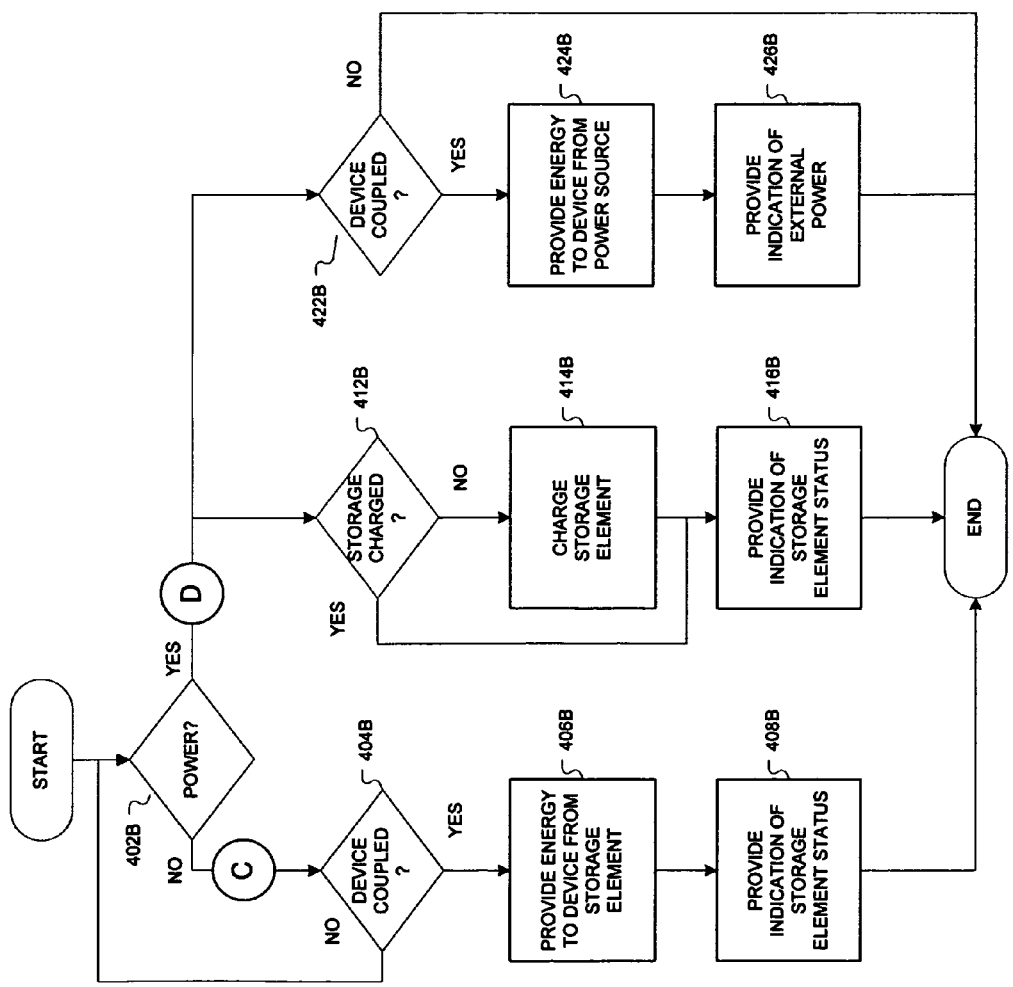

FIG. 6B is a flow diagram illustrating several methods 400B according to various embodiments. An ASIC 350B, 650B may employ the method 400B illustrated by the FIG. 6B flow diagram. The method 400B may determine whether sufficient power is being provided by an external power source 20B to power one or more devices 30, 130, 230, 30A, 30B (activity 402B). When the power is insufficient and at least one device is coupled to a MDPP 340B, 640B (activity 404B), the method 400B may provide energy to the one or more devices 30, 30A, 30B from an electrical storage element 56B (activity 406B) and provide an indication of the electrical storage element 56B via the user detectable signal generation device 358B (activity 406B, 408B).

When sufficient power is provided by the external power source 20B and the electrical storage device 56B is not fully charged (activity 412B) the method 400B may charge the electrical storage element 56B (activity 414B) and provide an indication of the electrical storage element 56B charge level via the user detectable signal generation device 358B (activity 416B). Further when sufficient power is provided by the power source 2B0 (activity 402B) and at least one device 30, 30A, 30B is coupled to the MDPP 340B, 640B (activity 422B) the method 400B may provide energy to the one or more devices 30, 30A, 30B from the external power source 20B (activity 424B) and provide an indication of the existence of power from the external power source 20B via the user detectable signal generation device 358B (activity 426B).

Figure 6E:
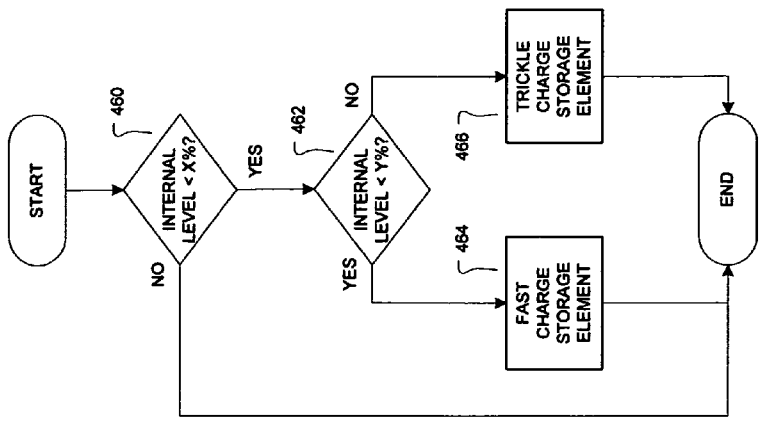
Figure 6D:
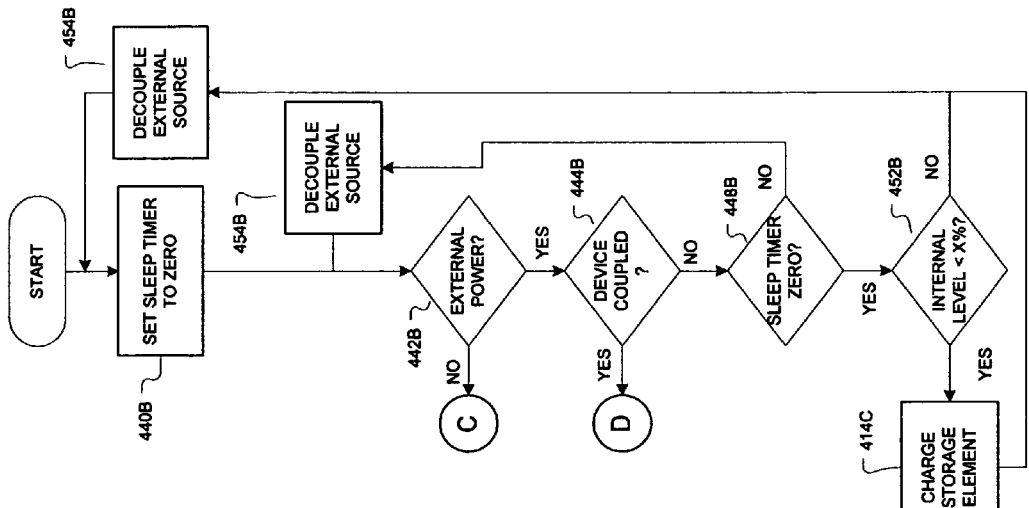
Figure 6C:
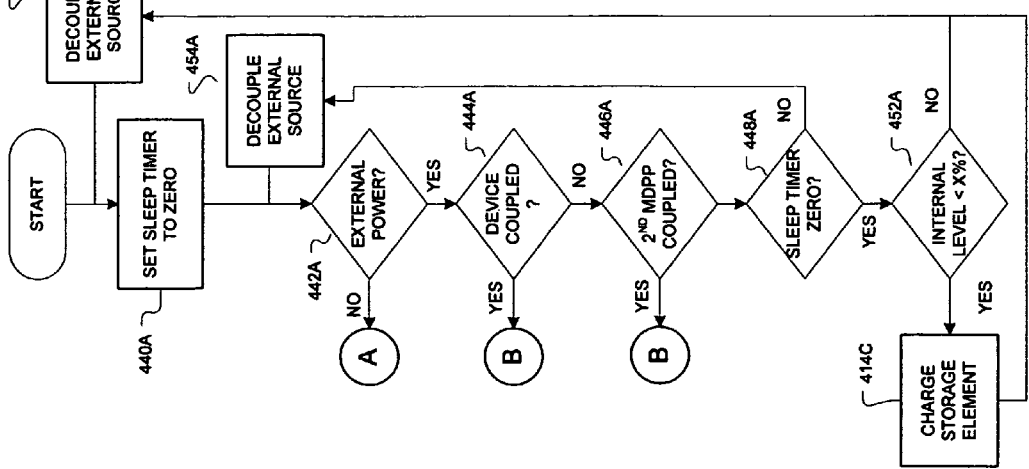

FIG. 6C is a flow diagram illustrating several methods 402A according to various embodiments. An ASIC 350A, 650A may employ the method 402A illustrated by the FIG. 6C flow diagram. The method 402A shown in FIG. 6C may be employed by the method 400A in an embodiment to reduce energy consumption when a device is not connected. The method 402A may set a sleep timer to zero (activity 440A). The method 402A determine whether adequate external power is provided to the system 500A, 10A, 100A, 300A (activity 442A) and may transfer control to section A when inadequate power is available. When adequate external power is detected, the method may determine whether a device is coupled to the provider system 500A, 10A, 100A, 300A or the second mobile power provider system 10B, 100B, 300B is coupled to the provider system (activities 444A and 446A).

When a device is coupled to the provider system 500A, 10A, 100A, 300A or the second mobile power provider system 10B, 100B, 300B is coupled to the provider system, control may be transferred to section B. Otherwise the method may determine whether a predetermined time interval has passed (sleep timer zero) activity 448A. When the time interval has not passed then the external power source may be decoupled (activity 454A) to save un-necessary power consumption. When the predetermined time interval has passed (sleep timer zero), the method 402A may determine whether the storage element 56A, 56B needs charging by comparing its storage level to a predetermined level or percentage of total capacity (activity 452A). When the internal level is less than the predetermined level or percentage, the method 402A may charge the storage element (activity 414C). The method 402A may then decouple the external power source (activity 454A) to save un-necessary power consumption and reset the sleep timer (activity 440A).

FIG. 6D is a flow diagram illustrating several methods 402B according to various embodiments. An ASIC 350A, 650A may employ the method 402B illustrated by the FIG. 6D flow diagram. The method 402B shown in FIG. 6D may be employed by the method 400B in an embodiment to reduce energy consumption when a device is not connected. The method 402B may set a sleep timer to zero (activity 440B). The method 402B determine whether adequate external power is provided to the system 10B, 100B, 300B (activity 442B) and may transfer control to section C when inadequate power is available or detected. When adequate external power is detected, the method may determine whether a device is coupled to the provider system 10B, 100B, 300B (activity 444B).

When a device is coupled to the provider system 10B, 100B, 300B, control may be transferred to section D. Otherwise the method may determine whether a predetermined time interval has passed (sleep timer zero) activity 448B. When the time interval has not passed then the external power source may be decoupled (activity 454B) to save un-necessary power consumption. When the predetermined time interval has passed (sleep timer zero), the method 402B may determine whether the storage element 56A, 56B needs charging by comparing its storage level to a predetermined level or percentage of total capacity (activity 452B). When the internal level is less than the predetermined level or percentage, the method 402B may charge the storage element (activity 414C). The method 402B may then decouple the external power source (activity 454B) to save un-necessary power consumption and reset the sleep timer (activity 440B).

In method 402A and 402B the internal power element 56A, 56B may provide energy to the system 500A, 10A, 10B, 140A, 140B, 300A, 300B when the external power is optionally decoupled. In an embodiment when the storage element 56A, 56B is depleted to a predetermined percentage X (activity 452A, 452B) the external power may be engaged to charge the storage element 56A, 56B (activity 414C). In an embodiment the predetermined percentage X may range from about 95% to 80%.

FIG. 6E is a flow diagram illustrating several methods 414 according to various embodiments. An ASIC 350A, 650A or system 500A, 10A, 10B, 140A, 140B, 300A, 300B may employ the method 414 illustrated by the FIG. 6E flow diagram. The method 414 shown in FIG. 6E may be employed by the methods 400A, 400B in an embodiment to optimize storage element 56A, 56B charging. In the method 414 a storage element 56A, 56B may not be charged when the determined energy level is greater than X percentage (activity 460). The method 414 may fast charge the storage element 56A, 56B when the determined level is less than Y % (activity 462, 464). The method 414 may slow or trickle charge the storage element 56A, 56B when storage level is greater than Y % and less than X % (activity 462, 466). In an embodiment X may be about 95% of maximum storage capacity and Y may be about 80% of maximum storage capacity.

Figure 7:
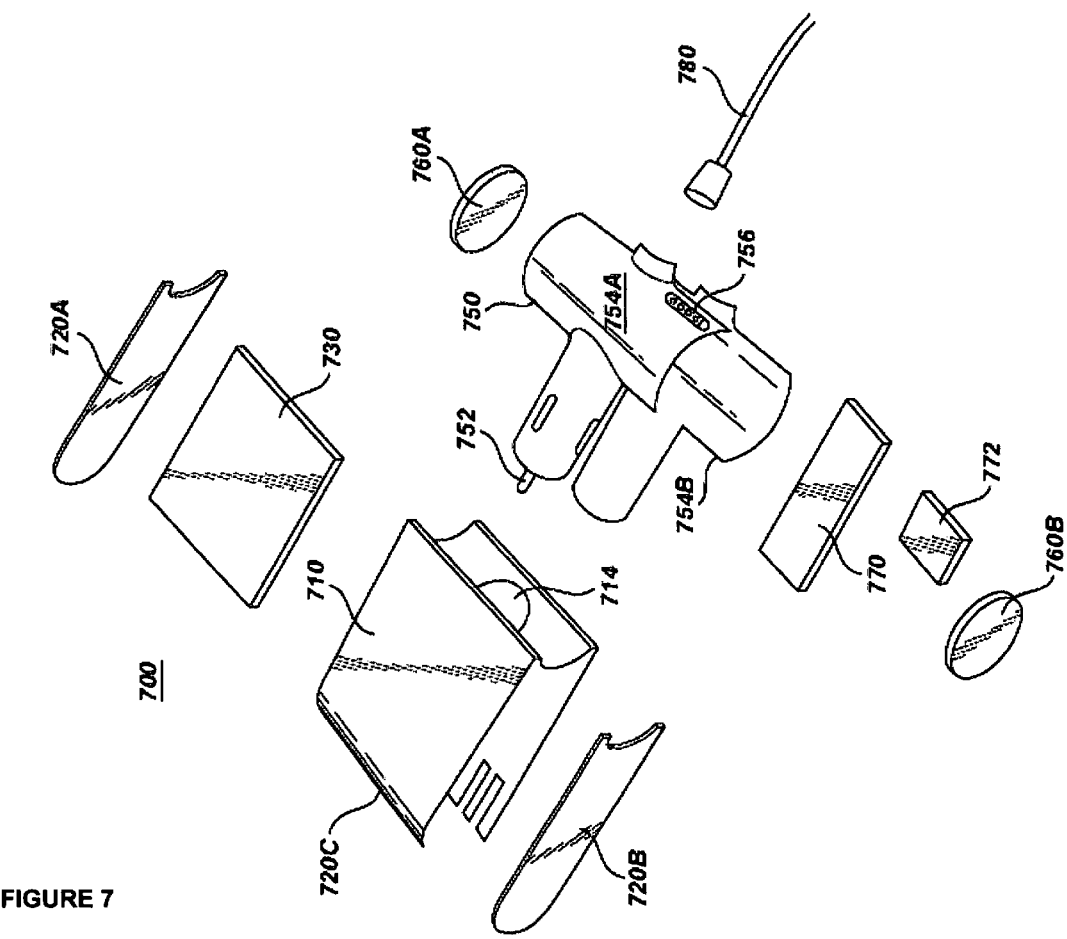
FIG. 7 is a diagram of an architecture including a first and a second mobile device power supply element according to various embodiments.

FIG. 7 is a block diagram of architecture 700 including a first and a second mobile device power supply element according to various embodiments. The architecture 700 may include a first MDPP 710 and a second MDPP 750. The first MDPP 710 may have a housing 720C including a right 720A and a left 720B side cap and a recess 714. The first MDPP 710 may include a circuit board 730 that functions as an ASIC 650A, 350A. The second MDPP 750 may also include a circuit board 770, user detectable devices 756, upper housing 754A, lower housing 754B, power interface 752, battery 772, right 760A and left 760B side cap. The circuit board 770 may function as an ASIC 650B, 350B. The power interface 752 may function as power coupling 20B. The user detectable devices 756 may function as a user detectable device 358B, 58B. The second MDPP 750 power interface 752 may fit in the first MDPP 710 recess 714. A wire 780 may be coupled to the MDPP 710, 750 to provide power or couple a MDPP 710, 750 to a mobile device 30, 30A, 30B.

Figure 8:
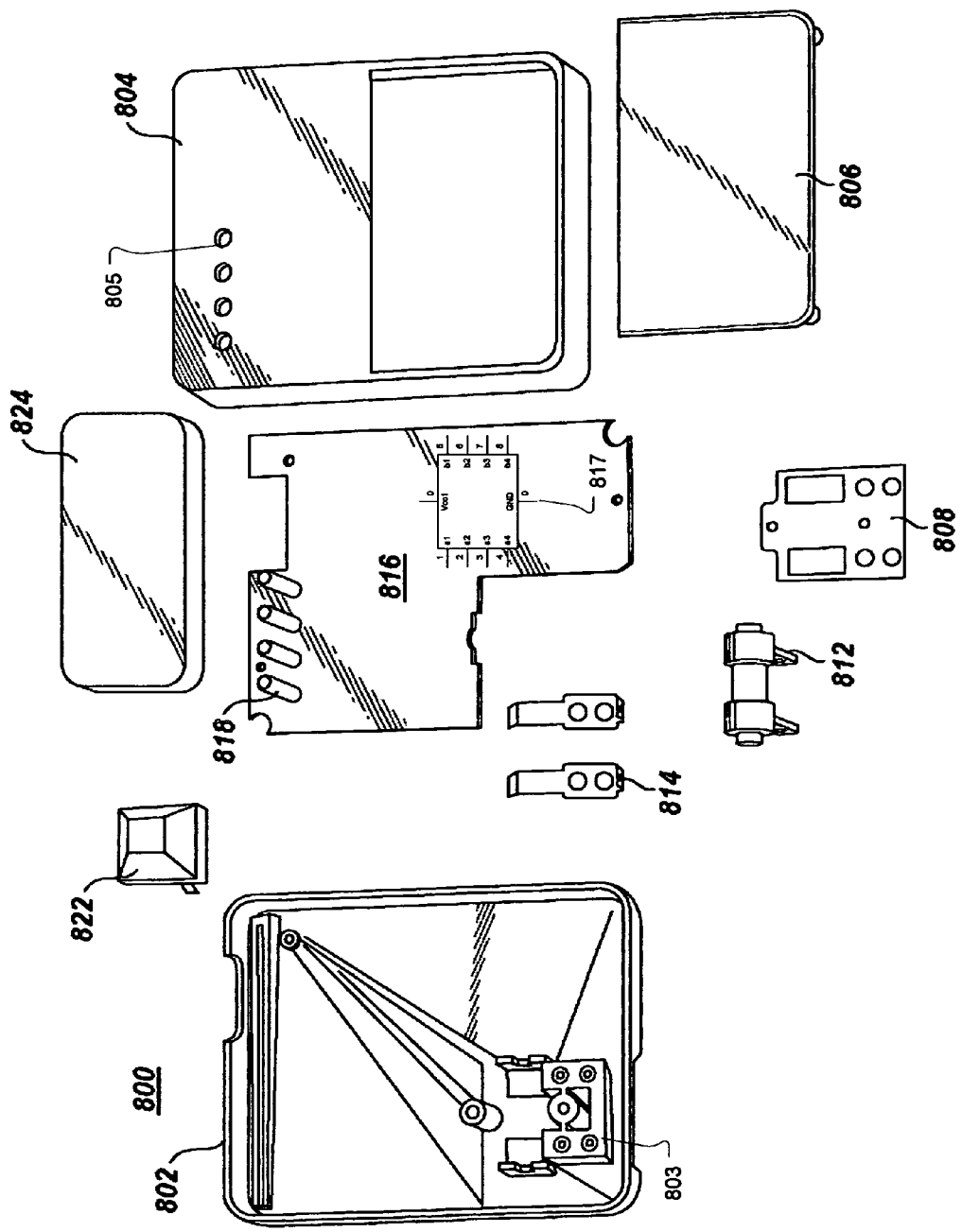
FIG. 8 is a diagram of an architecture including a mobile device power supply according to various embodiments.

FIG. 8 is a diagram of an architecture including a mobile device power supply 800 according to various embodiments. The mobile device power supply 800 may be employed in various embodiments including 500B, 10B, 100B, 200B, 300B, and 600B. In an embodiment the mobile device power supply 800 may include a back body 802, front body 804, battery cover 806, electrical contacts 812, spring prongs 814, contact plate 808, circuit board 816, universal serial bus (USB) module 822, and a battery pack 824. The circuit board 816 may include one or more LEDs 818 and a processor 817. The back cover 802 may include an electrical prong module holder 803. The electrical prong module may include electrical contacts 812, spring prongs 814, and contact plate 808 as know to those of skill in the art. The USB module 822 may be coupled to the circuit board 816.

The front cover 804 may have one or more openings 805 for the LEDs 818. The battery 824 may be coupled to the circuit board 816 and be located under the battery cover 806. In an embodiment the battery cover 806 may be removable so the battery 824 may be replaced periodically.

Figure 9B:
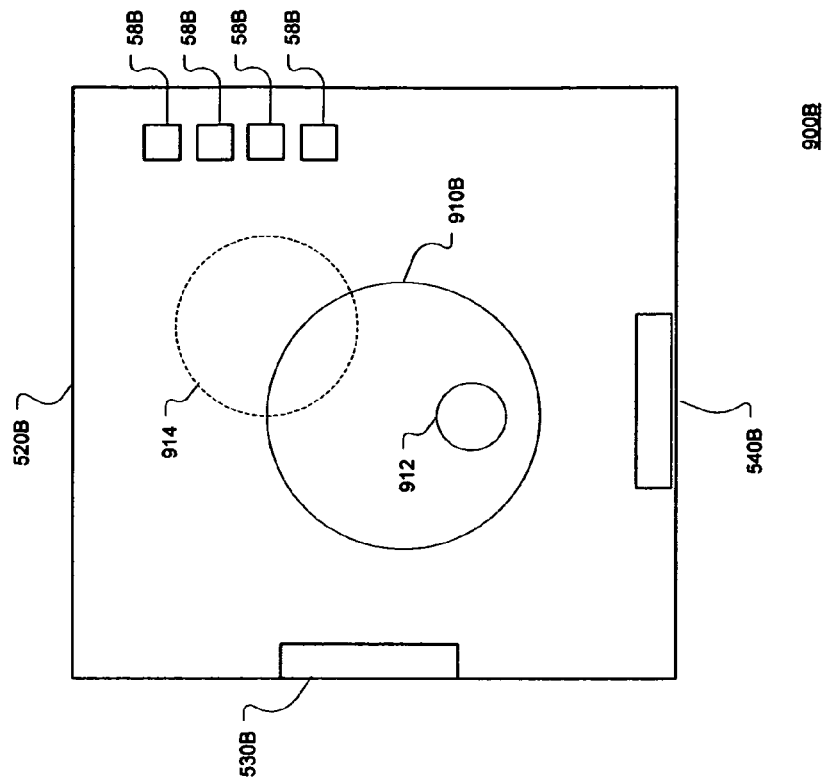
FIG. 9B is a front view of a simplified diagram of another mobile device power supply architecture according to various embodiments.
Figure 9A:
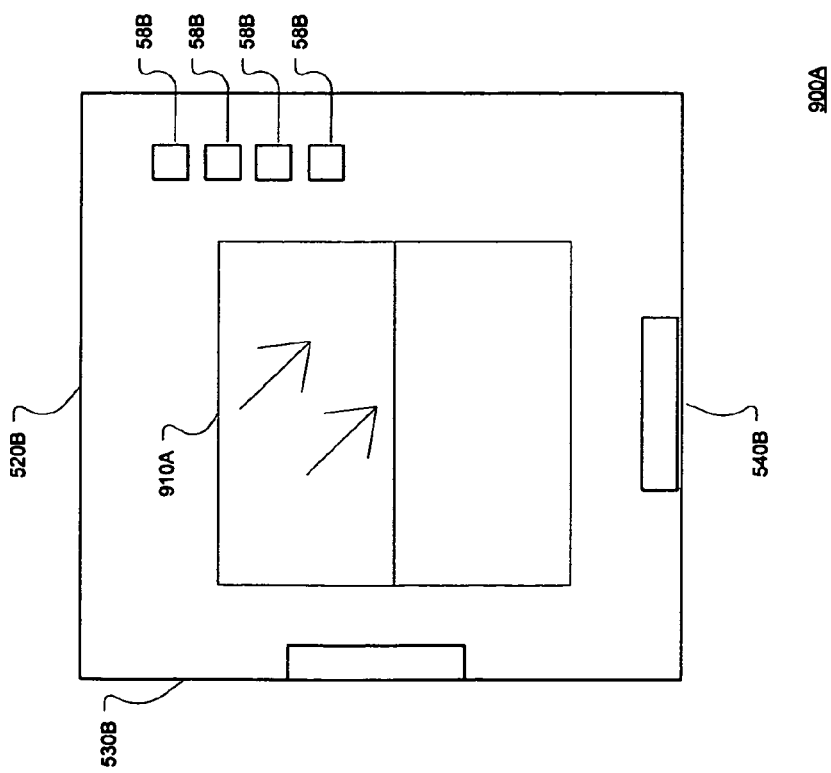
FIG. 9A is a front view of a simplified diagram of a mobile device power supply architecture according to various embodiments.

FIG. 9A is a front view of a simplified diagram of a mobile device power supply architecture 900A according to various embodiments. The architecture 900A includes a mobile device power supply such as 500B, 10B, 100B, 200B, 300B, and 600B and solar panel 910A. The solar panel 910A may be coupled to a power supply 500B, 10B, 100B, 200B, 300B, and 600B and provide another energy source.

FIG. 9B is a front view of a simplified diagram of a mobile device power supply architecture 900B according to various embodiments. The architecture 900B includes a mobile device power supply such as 500B, 10B, 100B, 200B, 300B, and 600B and a hand crank electrical generator 910B. The hand crank electrical generator 910B may include a crank 912 and electrical generator 914 coupled to the crank 912. The electrical generator 914 may be coupled to a power supply 500B, 10B, 100B, 200B, 300B, and 600B and provide another energy source. The electrical generator 914 may be a magnetic induction charging generator 914 in an embodiment.

Any of the components previously described can be implemented in a number of ways, including embodiments in software. Any of the components previously described can be implemented in a number of ways, including embodiments in software. Thus, the AC/DC coupling 42A, 42B, transformer/inverter 44A, switch controller module 46A, 46B, charging module 48A, 48B, USB interface 52A, 352A, 552A, 52B, 352B, 552B device specific interface 152A, 152B, device specific interface 252A, 252B, ASIC 350A, 350B, 650A, 650B may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments. The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion. A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A direct current powered mobile device power supply apparatus, including:
   an external power source coupling module, the external power source coupling module including at least two electrically conductive mechanical elements;
   an internal electrical storage module, the internal electrical storage module including a storage element storing and discharging electrical energy;
   a charging module operatively coupled to electrical storage module and operatively coupled to the external power source coupling module, the charging module charging the storage element;
   a direct current interface module;
   a switching module operatively coupled to electrical storage module, operatively coupled to the direct current interface module, and operatively coupled to the external power source coupling module, the switching module providing energy from the electrical storage module to the direct current interface module as a function of the energy provided from the external power source coupling module;
   a transformer module, the transformer module operatively coupled to the external power source coupling module and the switching module, the transformer module transforming alternating current to direct current; and
   a plurality of user perceptible signal generation modules, the signal generation modules providing an indication of the energy level of the internal electrical storage module.

2. The direct current powered mobile device power supply apparatus of claim 1, the switching module providing energy from the electrical storage module to the direct current interface module when the energy provided from the external power source coupling module is below a predetermined threshold.

3. The direct current powered mobile device power supply apparatus of claim 1, wherein an alternating current signal is provided on the external power source coupling module, the alternating current signal have about having one of first predetermined voltage and a second predetermined voltage.

4. The direct current powered mobile device power supply apparatus of claim 1, wherein the internal electrical storage module storage element including a battery.

5. The direct current powered mobile device power supply apparatus of claim 4, wherein the plurality of user perceptible signal generation modules includes light emitting devices (LEDs) and the switching module providing energy from the electrical storage module to the direct current interface module when no energy is provided from the external power source coupling module.

6. The direct current powered mobile device power supply apparatus of claim 1, wherein the external power source coupling module is physically and mechanically separable from the other modules of the direct current powered mobile device power supply apparatus.

7. A direct current powered mobile device power supply apparatus, including:
    an external power source coupling module, the external power source coupling module including at least two electrically conductive mechanical elements;
    an internal electrical storage module, the internal electrical storage module including a storage element capable of storing and discharging electrical energy; and
    an integrated circuit module, the integrated circuit module including:
        a charging module operatively coupled to electrical storage module and operatively coupled to the external power source coupling module, the charging module charging the storage element;
        a direct current interface module;
        a switching module operatively coupled to electrical storage module, operatively coupled to the direct current interface module, and operatively coupled to the external power source coupling module, the switching module providing energy from the electrical storage module to the direct current interface module as a function of the energy provided from the external power source coupling module;
        a transformer module, the transformer module operatively coupled to the external power source coupling module and the switching module, the transformer module transforming alternating current to direct current; and
        a plurality of user perceptible signal generation modules, the signal generation modules providing an indication of the energy level of the internal electrical storage module.

8. The direct current powered mobile device power supply apparatus of claim 7, the switching module providing energy from the electrical storage module to the direct current interface module when the energy provided from the external power source coupling module is below a predetermined threshold.

9. The direct current powered mobile device power supply apparatus of claim 8, wherein an alternating current signal is provided on the external power source coupling module, the alternating current signal having one of first predetermined voltage and a second predetermined voltage.

10. The direct current powered mobile device power supply apparatus of claim 7, wherein the internal electrical storage module storage element including a battery.

11. The direct current powered mobile device power supply apparatus of claim 10, wherein the plurality of user perceptible signal generation modules includes light emitting devices (LEDs) and the switching module providing energy from the electrical storage module to the direct current interface module when no energy is provided from the external power source coupling module.

12. The direct current powered mobile device power supply apparatus of claim 7, wherein the external power source coupling module is physically and mechanically separable from the other modules of the direct current powered mobile device power supply apparatus.

13. A method of supplying power to a direct current powered mobile device, including:
    providing an external power source coupling module, the external power source coupling module including at least two electrically conductive mechanical elements and couplable to an external power source;
    providing an internal electrical storage module, the internal electrical storage module including a storage element storing and discharging electrical energy;
    operatively coupling an electrical storage module and the external power source coupling module to a charging module, the charging module charging the storage element;
    providing energy from the electrical storage module to the direct current interface module as a function of the energy provided from the external power source coupling module;
    transforming an alternating current signal from the external power source coupling module to a direct current signal; and
    providing an indication of the energy level of the internal electrical storage module via a plurality of user perceptible signal generation modules.

14. The method of supplying power to a direct current powered mobile device of claim 13, including providing energy from the electrical storage module to the direct current interface module when the energy provided from the external power source coupling module is below a predetermined threshold.

15. The method of supplying power to a direct current powered mobile device of claim 14, wherein the alternating current signal has one of first predetermined voltage and a second predetermined voltage.

16. The method of supplying power to a direct current powered mobile device of claim 13, wherein the internal electrical storage module storage element including a battery.

17. The method of supplying power to a direct current powered mobile device of claim 16, wherein the plurality of user perceptible signal generation modules includes light emitting devices (LEDs) and the switching module providing energy from the electrical storage module to the direct current interface module when no energy is provided from the external power source coupling module.

18. The method of supplying power to a direct current powered mobile device of claim 13, wherein the external power source coupling module is physically and mechanically separable from the other modules of the direct current powered mobile device power supply apparatus.

* * * * *